US009886512B2

(12) United States Patent
Pu et al.

(10) Patent No.: US 9,886,512 B2
(45) Date of Patent: Feb. 6, 2018

(54) SOFTWARE RECOMMENDING METHOD AND RECOMMENDING SYSTEM

(71) Applicant: BEIJING QIHOO TECHNOLOGY COMPANY LIMITED, Xicheng District, Beijing (CN)

(72) Inventors: Xin Pu, Beijing (CN); Ye Tian, Beijing (CN); Yiping Liu, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 193 days.

(21) Appl. No.: 14/364,962

(22) PCT Filed: Dec. 12, 2012

(86) PCT No.: PCT/CN2012/086473
§ 371 (c)(1),
(2) Date: Jun. 12, 2014

(87) PCT Pub. No.: WO2013/086987
PCT Pub. Date: Jun. 20, 2013

(65) Prior Publication Data
US 2014/0344254 A1 Nov. 20, 2014

(30) Foreign Application Priority Data
Dec. 14, 2011 (CN) .......................... 2011 1 0417166

(51) Int. Cl.
*G06F 17/30* (2006.01)
*G06Q 30/02* (2012.01)
*G06F 9/445* (2006.01)

(52) U.S. Cl.
CPC .......... *G06F 17/30867* (2013.01); *G06F 8/61* (2013.01); *G06Q 30/0282* (2013.01)

(58) Field of Classification Search
CPC ........... G06Q 30/0631; G06Q 30/0269; G06Q 30/0282; G06F 17/30867
(Continued)

(56) References Cited

U.S. PATENT DOCUMENTS 8,239,206 B1 * 8/2012 LeBeau ................. H04M 1/271
704/251
8,298,087 B1 * 10/2012 Smith ................ G06Q 30/0255
463/42
(Continued)

FOREIGN PATENT DOCUMENTS

CN 102957809 A * 3/2013
WO 2011106925 A1 9/2011

OTHER PUBLICATIONS

CN1467656, application published Jan. 14, 2004, Inventors: Zhang et al, English translation of abstract only, 1 page.
(Continued)

Primary Examiner — Jay Morrison
Assistant Examiner — Ken Hoang
(74) Attorney, Agent, or Firm — Baker & Hostetler LLP

(57) ABSTRACT

Disclosed are a software recommending method and a software recommending system. The method comprises: detecting software already installed and/or web application already run on a client (101); analyzing software already installed and/or web application already run on the client, and obtaining personalization data of the client user, wherein the personalization data include age data, and/or personality data, and/or gender data (102); providing a corresponding software recommending mechanism according to the personalization data of the client user (103). This solution makes software recommendations for different personalities of different users, so that the recommendations are more targeted; and a user also does not need to search a variety of
(Continued)

software for desired software through complicated operations.

19 Claims, 2 Drawing Sheets

(58) Field of Classification Search
USPC .... 709/204, 203, 216, 217, 224; 706/46, 48, 706/12, 45, 50; 707/E17.009, E17.014, 707/722, 736, 749, 758, 769
See application file for complete search history.

(56) References Cited

U.S. PATENT DOCUMENTS

| | | | |
|---|---|---|---|
| 8,468,164 B1* | 6/2013 | Paleja | G06F 17/30867 707/767 |
| 2002/0129368 A1 | 9/2002 | Schlack et al. | |
| 2006/0173556 A1* | 8/2006 | Rosenberg | G06F 17/30867 700/3 |
| 2006/0195441 A1* | 8/2006 | Julia | G06F 17/30035 |
| 2011/0016479 A1* | 1/2011 | Tidwell | G06Q 30/02 725/9 |
| 2012/0072283 A1* | 3/2012 | DeVore | G06Q 30/0251 705/14.49 |
| 2013/0085886 A1* | 4/2013 | Satish | G06Q 30/02 705/26.7 |
| 2013/0268396 A1* | 10/2013 | Agevik | G06Q 30/0631 705/26.7 |
| 2014/0040171 A1* | 2/2014 | Segalov | G06Q 30/02 706/12 |

OTHER PUBLICATIONS

CN101236563A, application published Aug. 6, 2008, Inventors: Liu et al, English translation of abstract only, 1 page.
CN101867594A, application published Oct. 20, 2010, Inventors: Bai et al, English translation of abstract only, 1 page.
CN102158536A, application published Aug. 17, 2011, Inventors: Cai, English translation of abstract only, 1 page.
CN102541590A, application published Jul. 4, 2012, Inventors: Liu et al, English translation of abstract only, 1 page.
International Search Report regarding PCT/CN2012/086473, dated Mar. 7, 2013, 4 pages.

\* cited by examiner

SOFTWARE RECOMMENDING METHOD AND RECOMMENDING SYSTEM

FIELD OF THE INVENTION

The present invention relates to the technical field of computers, and particularly to a software recommending method and recommending system.

BACKGROUND OF THE INVENTION

A common computer user installs on his PC various software such as software ensuring basic use (anti-virus, browser, input method, and so on), office software (Office, and so on), recreation software (music, games, video, and so on), professional tool software, and so on. A user usually downloads software through a dedicated software downloading website which classifies software and provides software downloading addresses so that the user may enter the classes to look up a desired software and click to download it.

However, currently there are more and more various software and there are also many options in one class of software so that even though the dedicated software download website performs software classification or software download ranking, it is very difficult for the user to pick up a suitable software from so many software and know which software is useful.

Moreover, as the number of software is increasing and the classification of software gets finer and finer, the user can successfully look up the desired software quickly only when he is very familiar with the website's software classification and software to be looked up, otherwise he very probably fails to find the software or takes a lot of time to find the desired software.

Therefore, a software recommending method is needed to solve problems such as tedious operation steps upon downloading the software and waste of a lot of times upon looking up a desired software, to meet the user's various different needs.

SUMMARY OF THE INVENTION

In view of the above problem, the present invention is proposed to provide a software recommending device and corresponding software recommending method, which overcome the above problems or at least partially solve or ease the above problems.

According to an aspect of the present invention, there is provided a software recommending method, comprising:

detecting software already installed and/or web application already run on a client;

analyzing software already installed and/or web application already run on the client, and obtaining personalization data of the client user, wherein the personalization data include age data, and/or personality data, and/or gender data; and providing a corresponding software recommending mechanism according to the personalization data of the client user.

Therein the personality data comprises information describing personality and hobbies.

Therein the providing a corresponding software recommending mechanism comprises: providing a corresponding software recommendation list; and/or providing a corresponding software recommendation list and providing relevant operations of the recommended software, wherein the relevant operations include adjusting interface layout, and/or adjusting a size of font display, and/or adjusting interface display brightness.

According to another aspect of the present invention, there is provided a software recommending system, comprising:

a software detecting module configured to detect software already installed and/or web application already run on a client;

a software analyzing module configured to analyze software already installed and/or web application already run on the client, and obtain personalization data of the client user, wherein the personalization data include age data, and/or personality data, and/or gender data; and a software recommending module configured to provide a corresponding software recommending mechanism according to the personalization data of the client user.

Therein the personality data comprises information describing personality and hobbies.

According to yet another aspect of the present invention, there is provided a computer program which comprises a computer readable code; when the computer readable code is run on a server, the server is caused to execute the software recommending method.

According to yet again another aspect of the present invention, there is provided a computer readable medium which stores the computer program.

Advantageous effects of the present invention are as follows:

First, the present application detects which software is already installed on the client or which web application are already run on the client, then analyzes these software or web applications to obtain the client user's personalization data which comprise age data, and/or personality data, and/or gender data, then provides a corresponding software recommending mechanism according to the personalization data of the client user, so as to automatically recommend the user-desired software for the user. By analyzing user' use inclinations for the user-installed software or client-run web applications, this software recommendation manner purposefully for different personalities of different users may provide more purposeful recommendation and recommend more useful software for the user. Furthermore, the user needn't look up his desired software from a diversity of software through complicated operations.

Secondly, upon recommending software, the present application can further provide description about the user's characteristics such as age, gender and personality, increase interest of recommendation and achieve a better recommendation effect.

Of course, any product implementing the present application does not necessarily simultaneously achieve all of the aforesaid advantages.

The above description is only generalization of technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. The drawings are only intended to illustrate preferred embodiments not to limit the present invention. Through the drawings, like reference signs refer to like parts. In the figures.

DETAILED DESCRIPTION OF THE INVENTION

The present invention will be further described below with reference to the drawings and specific embodiments.

The present application provides a software recommending method and system, which can recommend different software for different personalities of different users and do not require the user himself to look up the software.

The realization flow of the method according to the present application will be described in detail through embodiments.

Figure 1:
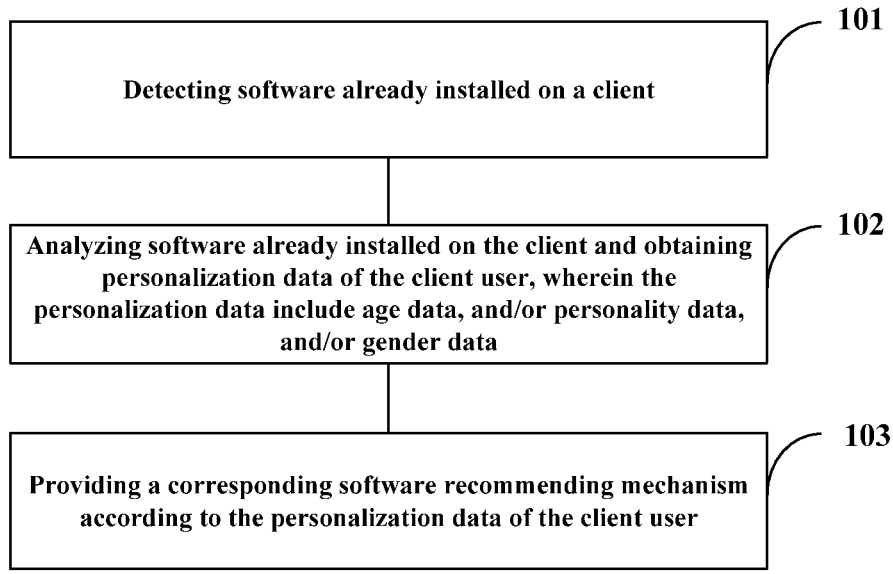
FIG. 1 schematically shows a flow chart showing steps of a software recommending method according to an embodiment of the present application.

Referring to FIG. 1, FIG. 1 is a flow chart a software recommending method according to an embodiment of the present application.

Step 101: detecting softwares already installed and/or web applications already run on a client;

The client may be various computers such as a desktop computer or a notebook computer, and also may be various handheld apparatus or portable apparatus such as mobile phone or IPAD, or other various apparatus that may be used as the client.

Specifically, a list of software already installed on the client may be obtained by detecting key values in a registration table of the client. For example, the following key values are detected:

HKEY_LOCAL_MACHINE\SOFTWARE\Microsoft\Windows\CurrentVersion/Uninstall;

HKEY_LOCAL_MACHINE\\SOFTWARE\\Microsoft\\Windows\\CurrentVersion\\Installer\\UserData\\*****\\Products.

The above first key value records an unloading character string and relevant property of the software already installed on the client, e.g., information such as an unloading path; if the client already installed a certain software, it is possible that the key value has record of information such as the unloading path.

The second key value records descriptive information of the already-installed software, for example, software name, edition number or creation time; if the client already installed a certain software, the relevant description might be included in the key value.

As known from the above, both the two kinds of registration table key values may be individually used to detect the software already installed on the client. If these key values include relevant software parameters, this indicates that this software has already been installed in the user's computer.

However, some software, upon installation, is recorded only in one of the key values, and not recorded in the other key value. Therefore, to more fully detect all software already installed on the client, embodiments of the present application employs a method of detecting the above two key values simultaneously to ensure detection accuracy.

The web application run on the client may be detected in the following manner:

for web applications opened and run on a client browser, they already-run web applications may be obtained by detecting browser events. For example, web pages opened through the browser, or network games opened through the browser, or the like, all are web applications opened and run by the browser. Specific web applications run on the client may be known so long as the browser events are captured and analyzed.

For web applications opened and run by a startup program already installed on the client, the already-run web applications may be obtained by detecting the startup program. The startup program is also a client program, and functions to start up the web application of a network side and load to the client. Therefore, the specific web application run on the client may be known by detecting whether such client startup program loads a certain web application.

Step 102: analyzing already installed-software and/or already-run web application on a client, and obtaining personalization data of the client user, wherein the personalization data include age data, and/or personality data, and/or gender data.

Software analysis will be given as an example below, and Analysis of the web application is similar to software analysis.

Usually, a user selects and installs different software according to properties such as his own age, personality and gender, and for example, users installing QQ are universally young, and users installing more game software usually like playing games. According to such software use characteristics, embodiments of the present application give various software different attributes such as software age, software personality and software gender. Personalization information of users using these software such as age, personality and gender can be inferred by analyzing attributes of the software already installed on the client.

Therein, the age data includes information describing age of a person, for example, "your current software age is 25 years old". The personality data include information describing personality and hobbies, e.g., "you are a quiet person", or "you like travelling". The gender data include information describing whether the user is a male or a female, e.g. "you are a gentleman", or "you are a lady". Such personalization data all may be outputted to the client to display to the user so as to increase the user's interest in use.

It needs to explain that the personalization data may be only age data, or only personality data, or only gender data, or all of the foregoing three kinds of data. Of course, the personalization data may also include other types of data, such as profession data, which all fall within the scope of personalization data described in the embodiments of the present application.

Step 103: providing a corresponding software recommending mechanism according to the personalization data of the client user.

Specifically, the software recommending mechanism may include many kinds of mechanisms, for example:

providing a corresponding software recommendation list, i.e., recommending different software with respect to different ages, personalities and genders so as to try to allow the recommended software to meet users' needs and to be used by users. For example, software conforming to the user's personality is recommended.

Alternatively, a corresponding software recommendation list is provided and relevant operations of the recommended software is provided, wherein the relevant operations include adjusting interface layout, and/or adjusting a size of font display, and/or adjusting interface display brightness. For example, whilst relevant software is recommended to the elderly, the elderly are reminded, in a manner of a button or a selection box, whether the elderly user needs to enlarge font display. If the elderly user clicks the button or selection box, the font will be displayed larger; whilst the relevant software is recommended to a female user, various interface layouts designed specifically for females will be recommended; alternatively, whilst the relevant software is recommended to users surfing on the internet in a long time period, the users are reminded whether to adjust interface display brightness slightly dimmer to protect eyes. Certainly, the relevant operations are not limited to the above-listed situations, and they may include operations in other various application situations.

How to perform software analysis and software recommendation are described in detail by way of examples based on the above content.

1. Software Analysis 1.1 Age Analysis

The age analysis may specifically include the following sub-steps:

Sub-step 1: looking up a software analysis library in which an age score corresponding to each software is preset;

Sub-step 2: obtaining the age score corresponding to each software already installed on the client;

Sub-step 3: calculating the age data of the client user according to the age score corresponding to each software already installed on the client.

In sub-step 3, multiple calculating methods may be employed, for example:

accumulatively adding up a preset reference age data with the age scores corresponding to all software already installed on the client, to obtain the client user's age data; or inputting the age scores corresponding to all software already installed on the client into a functional relation formula and calculating the client user's age data.

By way of examples, the software analysis library first classify all software, and the specific software classification may be as follows:

security and anti-virus, browser, chat, games, music, video, downloading, input method, picture, compression, stock and online bank, and so on.

Secondly, in the software analysis library, a reference age is set, and an age score is set for each software according to the user's usage, wherein software with plus score indicates that ages of the user group are older, and software with minus score indicates that ages of the user group are younger. Specific scores are set as follows:

| Reference age: 26 | |
|---|---|
| qq | +1 |
| 360 Security Browser | +2 |
| PPS | −1 |
| Thunder | +1 |
| QvodPlay | +1 |
| Storm Player | +1 |
| KuGou | −1 |
| Kuwo | −1 |

| -continued | |
|---|---|
| Reference age: 26 | |
| Mito Xiuxiu | −2 |
| Funshion | +1 |
| Pptv | +1 |
| 360 Compression | −1 |
| 360 Extreme Explorer | −1 |
| Fetion | −1 |
| HardwareMaster | +1 |
| Duowan YY | −1 |
| Aliwangwang | +1 |
| Youdao Dictionary | −2 |
| Qq music | −1 |
| eDonkey | +1 |
| Winrar | +1 |
| Uusee | +1 |

Assume that a user install the following eight software:

Q Q, Kuaiwan, Aliwangwang, 360 Security Guard, 360 Anti-virus, Qq Music, Sogou Input Method, and 360 Security Browser.

The age may be calculated according to the respective software age scores corresponding to the software installed by the user, for example:

Qq plus 1 year old, Kuaiwan minus 4 years old, Aliwangwang minus 2 years old, 360 Security Guard plus 2 years old, 360 Anti-virus plus 2 years old, Qq Music minus 2 years old, Sogou Input Method plus 1 year old, and 360 Security browser plus one year old.

Finally, the user's software age is obtained as 25 years old by adding up these data with 26.

Of course, the above scores are only for illustration purpose, and other forms may be employed to indicate the age-affecting date of the software.

In addition, to make calculation more reasonable, simulation calculation may be performed by using a curvilinear function to make the calculation result more conform to actual situations.

1.2 Personality Analysis

Users' software personalities are mainly distinguished by the number of installed software among the classes, for example, a lot of software is installed in the class "games", it is believed that the user is keen on playing games and controlling. In a similar way, description of personalities in respective classes will be calculated and thereby personality analysis is formed.

The personality analysis may comprise the following sub-steps:

Sub-step 1: looking up the software analysis library and determining software classes to which each software already installed on the client belongs to;

Sub-step 2: making statistics of the number of software already installed on the client in each software class;

Sub-step 3: when the number of software already installed on the client in a certain software class is greater than or equal to a preset number in the software class, obtaining the personality data corresponding to the software class;

Sub-step 4: integrating personality data corresponding to the plurality of software classes in the same client to obtain the personality data of the client user.

Preferably, the following sub-steps may also be included before sub-step 4:

Sub-step 11: looking up the software analysis library in which special software and personality data corresponding thereto are preset;

Sub-step 22: when a certain software already installed on the client is a special software in the software analysis library, obtaining the personality data corresponding to the special software.

For example, with respect to the above software classes: security and anti-virus, browser, chat, game, music, vide, downloading, input method, picture, compression, stock and online bank.

The following detection criteria may be set forth:

| | | |
|---|---|---|
| security and anti-virus: | 0 | 2 |
| browser: | 1 | 3 |
| chat: | 1 | 3 |
| games: | 0 | 2 |
| music: | 0 | 2 |
| video: | 0 | 2 |
| download: | 0 | 2 |
| input method: | 0 | 2 |
| pictures: | 0 | 2 |
| compression: | 0 | 2 |
| stock and online bank: | 0 | 2 |

If the number of software already installed in a class is greater than or equal to the number on the right, this indicates that the installed software are more and a corresponding personality description may be presented for the class; if the number of software already installed in a class is less than or equal to the number on the left, this indicates that less software is installed and a personality description needn't be presented. Of course, the above detection criteria may be adjusted and even be divided finer.

Assume that a user simultaneously installs two security and anti-virus software, the corresponding personality description will be "lack of sense of security"; if the user further simultaneously installs three browsers, the corresponding personality description will be "N browsers are installed! If you are not a person fond of the new and tired of the old, you are surely a person keen on exploring and discovering fresh things, otherwise you will be a product manager of browser!" Finally, the above two kinds of personality data are synthesized into one paragraph.

In actual application, the personality data may employ the following format:

1) 2 to 4 characters are used to summarize the description and used as a header of the personality analysis:
for example, freedom, active, or mature.

2) A sentence is used to describe the personality to constitute the wording in the paragraph describing the user's personality analysis.

For example, "you, as a person loving life, are always seeking for a touch of warmth in the indifferent world, but how many people can really read your heart?"

There are more personality synthesizing formats as follows:

Landlyne is a person loving freedom, unrestraint and adventure.

You are usually unwilling to communicate with others because busy work thoroughly occupies your life; why not learn more about micro blog and may find thereon interest in communicating with others.

You, as a quiet person, is always afraid of other people interfering in your life, and you often stay at home to quietly experience the life of your own.

As a businessman, you communicate with different persons every day to win business success, but is such life really what you want?

I am Landlyne, I am "tech-savvy", let's enjoy, and your enjoyment is the only thing I want.

Besides, special software may be individually separated from the software classes and processed as special software. If the user installs such special software, the user's personality description may be determined directly, and personality description language for the special software will be used in place of the personality description language in the classes.

For example, the special software are as follows:
Security and anti-virus: Kaspersky
Brower: Firefox, ghrome
Chat: aliwangwang, Renren Desktop
Games: dota, Warcraft
Music: foobar2000
Pictures: meitu, cs, cad Assume the user install the software "Mito", the personality description will be directly derived as follows: "pursue for perfection, like beautiful things, and definitely you are surely narcissistic. You might not be an artist, but you must have an artistic temperament."

1.3 Gender Analysis

In so many software, some software are used by males more frequently, while some are used by females more frequently, so gender analysis may be performed for such software. The gender analysis specifically comprises the following sub-steps:

Sub-step 1: looking up the software analysis library in which a ratio of each software in two classes, namely, males and females, is preset respectively;

Sub-step 2: obtaining the respective ratios of each of the client-installed software in the two classes, namely, males and females;

Sub-step 3: adding up the ratios of the client-installed software according to the two classes, namely, males and females, comparing the total ratios after the addition, and selecting a gender with a higher total ratio as the gender data of the client user.

For example, the software gender summarized by statistics according to the users' usage is as follows:

| | | |
|---|---|---|
| Thunder | male 60% | female 40% |
| QvodPlay | male 90% | female 10% |
| Aliwangwang | male 20% | female 80% |
| Mito Xiuxiu | male 10% | female 90% |
| 360 HardwareMaster | male 90% | female 10% |
| Mito Kankan | male 30% | female 70% |
| CGA | male 80% | female 20% |
| Duowan YY | male 80% | female 20% |
| QQ Music | male 35% | female 65% |
| Storm Player | male 65% | female 35% |
| PPS | male 55% | female 45% |
| Kugou | male 45% | female 55% |
| Kuwo | male 55% | female 45% |
| Sogou Browser | male 65% | female 35% |
| PPLIVE | male 55% | female 45% |
| TTPlayer | male 65% | female 35% |
| Funshion | male 55% | female 45% |
| Kuaiwan | male 35% | female 65% |
| Fetion | male 55% | female 45% |

Assume that the user install the three software "Thunder", "360 HardwareMaster" and "Fetion", the use ratios of males are accumulated as 60%+90%+55%=205%, and the use ratios of femalese are accumulated as 40%+10%+45%=95%, it can be inferred that the user is a male user.

2. Software Recommendation

Different software lists may be recommended for different personality data. Several software recommendation cases are listed as follows, but the software recommendation manners based on the idea of the present application all fall within the protection scope of the present application.

2.1 Age-Orientated Software Recommendation

Based on the age data of the client user, a software recommendation list is recommended with age modified, which recommended software list comprises an age-fall software recommendation list and/or an age-rise software recommendation list.

If the user software age is smaller than his own actual age, an age-rise software list may be provided. If the user software age is greater than his own actual age, an age-fall software list may be provided.

For example:

a certain user's software age is calculated through software personality analysis as 32 years old, older than the user's actual age 28. At this time, there is a button reading "charge my software age". After the button is clicked, a two-column software list may be opened, the two columns being entitled "reduce my software age" and "raise my software age" respectively. The user may select and install software in any one of the columns of the list, and restart calculation to change the user's software age.

In actual application, it is also feasible to present two buttons respectively reading "reduce my software age" and "raise my software age", and the user clicks one of the buttons to open a corresponding software recommendation list.

2.2 Personality-Orientated Software Recommendation

Based on the client user's personality data, a key word related to the personality data is provided, and a software recommendation list is provided corresponding to the key word.

In the personality analysis, some key words are provided for each kind of personality, for example, game-aholic, music fan, or movie lover. A function button reading "what person I want to be" is provided to the user by integrating all key words. After the user clicks the button, he will see many key words with relevant depictions. For example, upon clicking a link entitled "I want to be a music fan", the user opens a relevant software recommendation list in which software and music requisite for a music fan are listed. As such, if the user installs one of the recommended software therein, he will win a title of "music fan".

2.3 Gender-Orientated Software Recommendation

A software recommendation list corresponding to the gender data is provided based on the client user's gender data.

As stated above, proportions of male use and female use are set for each software according to the user's usage. If the current user is analyzed to be a male, software mostly used by males, such as "360 HardwareMaster", is recommended; if the current user is a female, software mostly used females, e.g., "Mito Xiuxiu", is recommended.

To sum up, by analyzing user' use inclinations for the user-installed software, this software recommendation manner purposefully for different personalities of different users may provide more purposeful recommendation and recommend more useful software for the user. Furthermore, the user needn't look up his desired software from a diversity of software through complicated operations.

Besides, upon recommending software, the method according to the embodiments of the present application can further provide description about the user's characteristics such as age, gender and personality, increase interest of recommendation and achieve a better recommendation effect.

Based on the above illustration of method embodiments, the present application further provides a corresponding software recommending system embodiment to implement the content recited in the above method embodiments.

Figure 2:
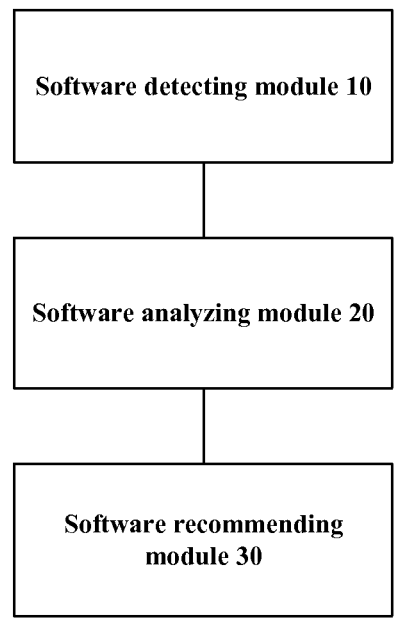
FIG. 2 schematically shows a block diagram of a software recommending system according to an embodiment of the present application.

Referring to FIG. 2, FIG. 2 is a block diagram of a software recommending system according to an embodiment of the present application.

The software recommending system may include the following modules:

a software detecting module 10 configured to detect software already installed and/or web application already run on a client;

a software analyzing module 20 configured to analyze software already installed and/or web application already run on the client, and obtain personalization data of the client user, wherein the personalization data include age data, and/or personality data, and/or gender data; and a software recommending module 30 configured to provide a corresponding software recommending mechanism according to the personalization data of the client user.

Therein, the personality data comprises information describing personality and hobbies.

Further, the software recommending module providing a corresponding software recommending mechanism may comprise:

providing a corresponding software recommendation list; and/or providing a corresponding software recommendation list and providing relevant operations of the recommended software, wherein the relevant operations include adjusting interface layout, and/or adjusting a size of font display, and/or adjusting interface display brightness.

Further, the software detecting module 10 may obtain a list of software already installed on the client by detecting key values in a registration table of the client.

Further, the software detecting module 10 may obtain web applications run on a client browser by detecting browser events; and/or, obtain web applications run by a startup program by detecting the startup program installed on the client.

Further, regarding the software age analysis, the software analyzing module 20 may specifically comprise the following sub-modules:

an age lookup sub-module configured to look up a software analysis library in which an age score corresponding to each software is preset;

an age obtaining sub-module configured to obtain the age score corresponding to each software already installed on the client; and an age calculating sub-module configured to calculate age data of the client user according to the age score corresponding to the software already installed on the client.

Therein the calculating sub-module accumulatively adds up a preset reference age data with the age scores corresponding to all software already installed on the client, to obtain the client user's age data; or, the calculating sub-module inputs the age scores corresponding to all software already installed on the client into a functional relation formula and calculates the client user's age data.

Further, regarding the software personality analysis, the software analyzing module 20 may specifically comprise the following sub-modules:

a class lookup sub-module configured to look up the software analysis library and determine software classes to which each software already installed on the client belongs to;

a class statistic sub-module configured to make statistics of the number of software already installed on the client in each software class;

a personality obtaining module configured to, when the number of software already installed on the client in a certain software class is greater than or equal to a preset number in the software class, obtain the personality data corresponding to the software class; and a personality synthesizing module configured to synthesize personality data corresponding to the plurality of software classes in the same client to obtain the personality data of the client user.

Optionally, the software analyzing module 20 may further comprise:

a special software lookup sub-module configured to look up the software analysis library in which special software and personality data corresponding thereto are preset;

the personality obtaining sub-module configured to, when a certain software already installed on the client is a special software in the software analysis library, obtain the personality data corresponding to the special software.

Further, regarding the software gender analysis, the software analyzing module 20 may specifically comprise the following sub-modules:

a gender lookup sub-module configured to look up the software analysis library in which a ratio of each software in two classes, namely, males and females, is preset respectively;

a gender obtaining sub-module configured to obtain the respective ratios of each of the client-installed software in the two classes, namely, males and females;

a gender determining sub-module configured to add up the ratios of the client-installed software according to the two classes, namely, males and females, comparing the total ratios after the addition, and selecting a gender with a higher total ratio as the gender data of the client user.

Further, based on the age data of the client user, the software recommending module 30 provides a software recommendation list with age modified, the recommended software list comprises an age-fall software recommendation list and/or an age-rise software recommendation list;

based on the client user's personality data, the software recommending module 30 provides a key word related to the personality data, and a software recommendation list is provided corresponding to the key word; and the software recommending module 30 provides a software recommendation list corresponding to the gender data based on the client user's gender data.

For the above embodiment of software recommending system, since it substantially corresponds to the method embodiment, it is described briefly, and reference can be made to the depictions in the method embodiment as shown in FIG. 1 for the corresponding portions.

Embodiments of the present description all are described in a progressive manner, reference may be made to identical or similar portions of embodiments, and each embodiment focuses on differences from other embodiments.

Moreover, "and/or" in the preceding text means that the text includes an "and" relation as well as "or" relation, wherein if solution A is in an "and" relation to solution B, it will be meant that a certain embodiment may simultaneously include solution A and solution B; if solution A is in an "or" relation to solution B, it is meant that a certain embodiment may individually comprise solution A, or individually comprise solution B.

Embodiments regarding parts in the present invention may be implemented in hardware, or implemented by one or more software modules running on a processor, or implemented in their combinations. Those skilled in the art should understand that a microprocessor or digital signal processor (DSP) may be used in practice to implement some or all functions of some or all parts of the device for detecting security of download link according to embodiments of the present invention. The present invention may also be implemented as an apparatus or device program (e.g., computer program and computer program product) for executing part or all methods described here. Such programs implementing the present invention may be stored in a computer-readable medium, or may be in a form having one or more signals. Such signals can be obtained by downloading from the Internet, or provided from a carrier signal or provided in any other forms.

Figure 3:
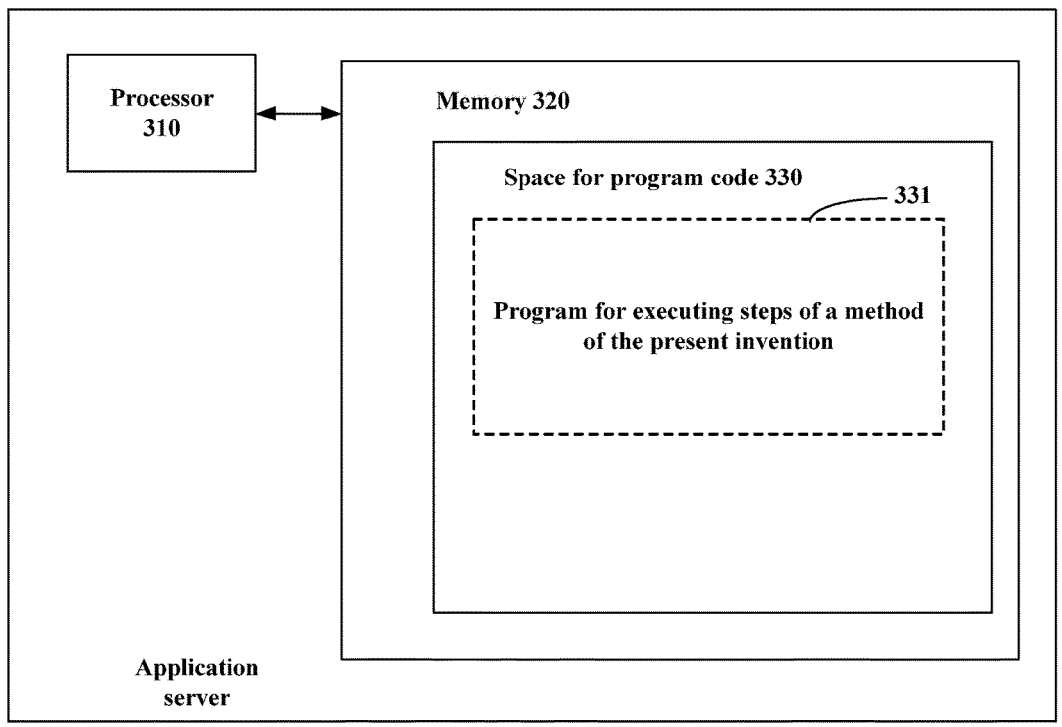
FIG. 3 schematically shows a block diagram of a server for executing the method according to the present invention.
Figure 4:
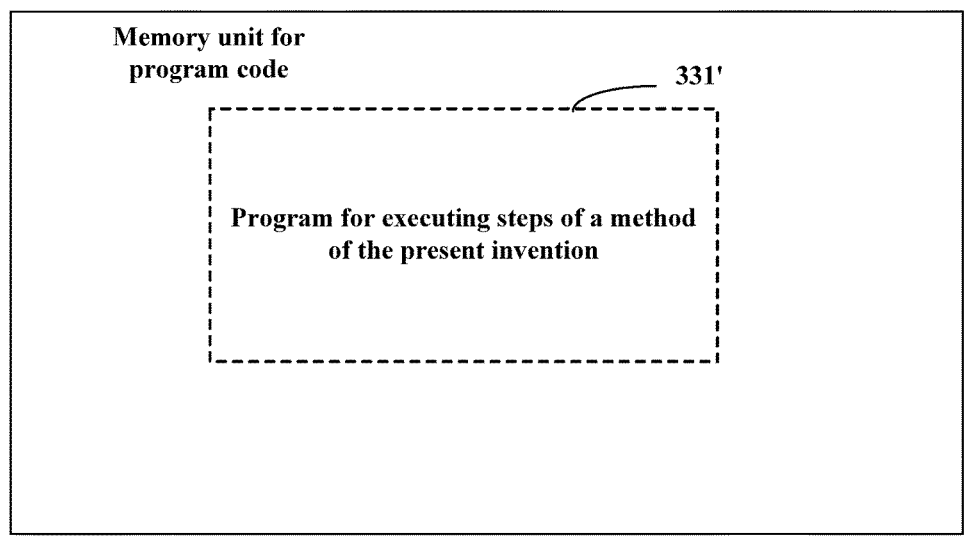
FIG. 4 schematically shows a memory unit for maintaining or carrying a program code for implementing the method according to the present invention.

For example, FIG. 3 shows a server, such as an application server, which can implement the software recommending method and/or software recommending system according to the present invention. The server conventionally comprises a processor 310 and a computer program product or computer-readable medium in the form of a memory (or storage) 320. The memory 320 may be a flash memory, EEPROM (Electrically Erasable Programmable Read-Only Memory), EPROM, hard disk or ROM-like electronic memory. The memory 320 has a storage space 330 for a program code 331 for executing any step of the above method. For example, the storage space 330 for the program code may comprise program codes 331 respectively for implementing steps of the above method. These program codes may be read from one or more computer program products or written into one or more computer program products. These computer program products comprise program code carriers such as hard disk, compact disk (CD), memory card or floppy disk. Such computer program products are usually portable or fixed memory unit as shown in FIG. 6. The memory unit may have a memory paragraph, a storage space or the like arranged in a similar way to the memory 320 in the server of FIG. 3. The program code may for example be compressed in a suitable form. Usually, the memory unit includes a computer-readable code 331', namely, a code readable by a processor for example similar to 310. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description as provided here describes a lot of specific details. However, it is appreciated that embodiments of the present invention may be implemented in the absence of these specific details. Some embodiments do not specify detail known methods, structures and technologies to make the description apparent.

It should be noted that the above embodiments illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims listing several units, several of these units can be embodied by one and the same item of hardware. The usage of the words first, second and third, et cetera, does not indicate any ordering. These words may be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A software recommending method, comprising:
    detecting software that has been installed or has been run on a client computing device;
    analyzing the software to obtain personality data, age data, or gender data associated with a client user of the computing device, wherein the personality data associated with the client user is determined based at least in part on at least one software classes of the software and personality description corresponding to the at least one software class, wherein the personality description corresponding to the at least one software class describes personality of a user who installs or runs a certain number of software in the at least one software class, wherein the analysing the software to obtain personality data associated with the client user of the computing device further comprises obtaining and synthesizing personality description corresponding to each of the at least one software class in response to a determination that a number of software among the software that has been installed or has been run on the client computing device in each of the at least one software class is greater than or equal to a corresponding threshold; and
    providing a corresponding software recommending mechanism according to the personality data, age data, or gender data associated with the client user, wherein the providing a corresponding software recommending mechanism according to the personality data associated with the client user further comprises providing a key word related to the personality data, and providing a software recommendation list corresponding to the key word.

2. The method according to claim 1, wherein
    the personality data comprises information describing personality and hobbies.

3. The method according to claim 1, wherein the providing a corresponding software recommending mechanism comprises:
    providing a corresponding software recommendation list; and/or
    providing a corresponding software recommendation list and providing relevant operations of the recommended software, wherein the relevant operations include adjusting interface layout, and/or adjusting a size of font display, and/or adjusting interface display brightness.

4. The method according to claim 1, wherein the providing a corresponding software recommending mechanism based on age data of the client user comprises:
    providing a software recommendation list with age modified, the recommended software list comprising an age-fall software recommendation list and/or an age-rise software recommendation list.

5. The method according to claim 1, wherein the providing a corresponding software recommending mechanism based on the client user's gender data comprises:
    providing a software recommendation list corresponding to the gender data.

6. The method according to claim 1, wherein the detecting software that has been installed or has been run on a client computing device comprises:
    obtaining a list of the software by detecting key values in a registration table of the client computing device.

7. The method according to claim 1, wherein the detecting software that has been installed or run on a client computing device comprises:
    obtaining web applications run by a browser by detecting browser events; and/or,
    obtaining web applications run by a startup program by detecting the startup program installed on the client computing device.

8. The method according to claim 1, wherein the analyzing software to obtain age data associated with a client user, comprises:
    looking up a software analysis library in which an age score corresponding to each software is preset;
    obtaining the age score corresponding to each of the software; and
    calculating age data of the client user according to the age score corresponding to the software.

9. The method according to claim 8, wherein the calculating age data of the client user according to the age score corresponding to the software comprises:
    accumulatively adding up a preset reference age data with the age scores corresponding to all of the software to obtain the client user's age data; or,
    inputting the age scores corresponding to all of the software into a functional relation formula and calculating the client user's age data.

10. The method according to claim 1, wherein the analyzing the software to obtain personality data of the client user, comprises:
    looking up a software analysis library and determining software classes to which each of the software belongs to;
    making statistics of, among the software, a number of software in each of the plurality of at least one software classes.

11. The method according to claim 10, wherein before synthesizing personality data corresponding to the plurality of software classes to obtain the personality data of the client user, the method further comprises:
    looking up the software analysis library in which special software and personality data corresponding thereto are preset; and
    when a certain software already installed on the client computing device is a special software in the software analysis library, obtaining the personality data corresponding to the special software.

12. The method according to claim 1, wherein the analysing the software to obtain gender data, comprises:
    looking up the software analysis library in which a ratio of each software in two classes, namely, males and females, is preset respectively;
    obtaining the respective ratios of each of the client-installed software in the two classes, namely, males and females; and
    adding up the ratios of the client-installed software according to the two classes, namely, males and females, comparing the total ratios after the addition, and selecting a gender with a higher total ratio as the gender data of the client user.

13. A software recommending system, comprising:
at least a processor;
at least a memory communicatively coupled to the at least processor and bearing instructions that upon execution by the at least processor cause the system at least to:
detect software that has been installed or has been run on a client computing device;
analyze the software to obtain personality data, age data, or gender data associated with a client user of the client computing device, wherein the personality data associated with the client user is determined based at least in part on at least one software class of the software and personality description corresponding to the at least one software class, wherein the personality description corresponding to the at least one software class describes personality of a user who installs or runs a certain number of software in the at least one software class, wherein the analysing the software to obtain personality data associated with the client user of the computing device further comprises obtaining and synthesizing personality description corresponding to each of the at least one software class in response to a determination that a number of software among the software that has been installed or has been run on the client computing device in each of the at least one software class is greater than or equal to a corresponding threshold; and
provide a corresponding software recommending mechanism according to the personality data, age data, or gender data associated with the client user, wherein the instructions that upon execution by the at least processor cause the system to provide a corresponding software recommending mechanism according to the personality data associated with the client user further comprises instructions that upon execution by the at least processor cause the system to provide a key word related to the personality data, and provide a software recommendation list corresponding to the key word.

14. The system according to claim 13, wherein
the personality data comprises information describing personality and hobbies.

15. The system according to claim 13, wherein the at least memory further storing instructions that upon execution by the at least processor cause the system to:
provide a corresponding software recommendation list; or
provide a corresponding software recommendation list and provide relevant operations of the recommended software, wherein the relevant operations include adjusting interface layout, adjusting a size of font display, or adjusting interface display brightness.

16. The system according to claim 13, wherein the at least memory further storing instructions that upon execution by the at least processor cause the system to:
based on age data of the client user, provide a software recommendation list with age modified, the recommended software list comprises an age-fall software recommendation list or an age-rise software recommendation list;
and
provide a software recommendation list corresponding to the gender data based on the client user's gender data.

17. The system according to claim 13, wherein the at least memory further storing instructions that upon execution by the at least processor cause the system to:
obtain a list of the software by detecting key values in a registration table of the client computing device.

18. The system according to claim 13, wherein the at least memory further storing instructions that upon execution by the at least processor cause the system to:
obtain web applications run by a browser by detecting browser events; or obtain web applications run by a startup program by detecting the startup program installed on the client computing device.

19. A computer readable medium which stores the computer program comprising a computer readable code, when the computer readable code is run on a server, the server executes a software recommending method, the method comprising:
detecting software that has been installed has been run on a client computing device;
analyzing the software installed to obtain personality data, age data, or gender data associated with a client user of the client computing device, wherein the personality data associated with the client user is determined based at least in part at least one software class of the software and personality description corresponding to the at least one software class, wherein the personality description corresponding to the at least one software class describes personality of a user who installs or runs a certain number of software in the at least one software class, wherein the analysing the software to obtain personality data associated with the client user of the computing device further comprises obtaining and synthesizing personality description corresponding to each of the at least one software class in response to a determination that a number of software among the software that has been installed or has been run on the client computing device in each of the at least one software class is greater than or equal to a corresponding threshold; and
providing a corresponding software recommending mechanism according to the personality data, age data, or gender data associated with the client user, wherein the providing a corresponding software recommending mechanism according to the personality data associated with the client user further comprises providing a key word related to the personality data, and providing a software recommendation list corresponding to the key word.

* * * * *